United States Patent [19]
Atsuta

[11] Patent Number: 5,247,221
[45] Date of Patent: Sep. 21, 1993

US005247221A

[54] VIBRATION WAVE DRIVEN ACTUATOR

[75] Inventor: Akio Atsuta, Kawasaki, Japan

[73] Assignee: Canon Kabushiki Kaisha, Tokyo, Japan

[21] Appl. No.: 855,483

[22] Filed: Mar. 23, 1992

Related U.S. Application Data

[63] Continuation of Ser. No. 424,735, Oct. 20, 1989, abandoned.

[30] Foreign Application Priority Data

Oct. 21, 1988 [JP] Japan .................. 63-265675

[51] Int. Cl.$^5$ ............................................ H01L 41/08
[52] U.S. Cl. ..................... 310/323; 310/316
[58] Field of Search ............... 310/323, 322, 365, 366

[56] References Cited

U.S. PATENT DOCUMENTS

| | | | |
|---|---|---|---|
| 4,510,411 | 4/1985 | Hakamata et al. ................ | 310/316 |
| 4,649,311 | 3/1987 | Mukohjima et al. ............... | 310/323 |
| 4,658,172 | 4/1987 | Izukawa ........................ | 310/323 X |
| 4,692,649 | 9/1987 | Izukawa ........................ | 310/323 X |
| 4,763,148 | 8/1988 | Tsukimoto et al. ............... | 310/323 X |
| 4,771,203 | 9/1988 | Mukohjima et al. ............... | 310/328 X |
| 4,833,358 | 5/1989 | Suzuki et al. ................... | 310/328 X |
| 4,914,337 | 4/1990 | Takagi .......................... | 310/316 |
| 4,926,084 | 5/1990 | Furutsu et al. ................. | 310/323 X |

FOREIGN PATENT DOCUMENTS

| | | | |
|---|---|---|---|
| 62-201072 | 9/1987 | Japan . | |
| 0244284 | 10/1987 | Japan ................ | 310/323 |
| 0012881 | 1/1989 | Japan ................ | 310/323 |
| 0034185 | 2/1989 | Japan ................ | 310/323 |
| 0238471 | 9/1989 | Japan ................ | 310/323 |
| 0238476 | 9/1989 | Japan ................ | 310/323 |

Primary Examiner—Mark O. Budd
Attorney, Agent, or Firm—Fitzpatrick, Cella, Harper & Scinto

[57] ABSTRACT

In the present invention, electromechanical energy conversion elements are disposed on a vibrator, and first and second electrodes are provided on the elements. AC voltages having different phases from each other are applied to the first and second electrodes to produce a travelling vibration wave, which relatively moves the vibrator and a member subjected to pressure contact with the vibrator. Furthermore, in a vibration wave motor having means for detecting vibration state via a third electrode, by, for example, making characteristics of elements adjacent to both sides of the third electrode identical to prevent that the center of sensitivity deviates from the center of the electrode, the correct resonance frequency is detected.

14 Claims, 5 Drawing Sheets

CENTER OF CENTER OF
ELECTRODE SENSITIVITY

VIBRATION WAVE DRIVEN ACTUATOR

This application is a continuation of application Ser. No. 07/424,735 filed Oct. 20, 1989, now abandoned.

BACKGROUND OF THE INVENTION

1. Field of the Invention

This invention relates to a vibration wave driven actuator for moving a vibrator relative to a member contacting the vibrator by a travelling vibration wave produced in the vibrator.

2. Description of the Related Art

Heretofore, piezoelectric elements of an annular vibration wave motor have been arranged as shown in FIG. 6. As described, for example, in Japanese Patent Laid-open Application No. 62-201072 (1987), two groups of piezoelectric elements, A and B, are arranged around the vibration wave motor. Each electrode for the two groups of piezoelectric elements is arranged at a pitch of $\frac{1}{2}$ of the wavelength excited in an annular vibrator, and the two groups are offset with a phase shift equal to $\frac{1}{2}$ of the pitch, that is, $\frac{1}{4}$ of the wavelength, from each other. Between the two groups of electrodes, there are provided a sensor electrode S for detecting the vibration state of the annular vibrator, that is, an electrode for detecting a voltage produced in the piezoelectric element and the like due to the vibration of the vibrator, a common electrode C and the like. Each of phase-A and phase-B piezoelectric elements has been subjected to polarization processing, polarity of which is alternately reversed.

By applying a voltage $V = V_D \sin \omega t$ to the group of phase-A electrodes and a voltage $V = V_0 \sin(\omega t \pm \pi/2)$ to the group of phase-B electrodes, a travelling vibration wave is produced in the vibrator, and a movable body, such as paper, film, a rotor and the like, subjected to pressure contact with the vibrator is moved due to friction.

It is possible to switch the moving direction of the movable body by $(+)$ or $(-)$ in the above-described expression. In the case of $(-)$, that is, when a voltage which is delayed $\pi/2$ (90°) in phase relative to an AC voltage applied to the phase-A electrodes is applied to the phase-B electrodes, the movable body is rotateted in the clockwise (CW) direction. In the case of $(+)$, that is, when a voltage which is advanced $\pi/2$ (90°) in phase relative to an AC voltage applied to the phase-A electrodes is applied to the phase-B electrodes, the movable body is rotated in the counterclockwise (CCW) direction.

A phase-S signal is detected by the sensor electrode S and is a signal which has the same frequency as that of an AC voltage applied to the phase-A electrodes. According to a phase shift between the AC voltage applied to the phase-A electrodes and the phase-S signal detected by the electrode S, it is possible to know if the vibration is in a resonance state having a large amplitude, or the degree to which the vibration deviates from the resonance state. It is further possible to control the rotation speed by determining a frequency to be applied from this information.

FIG. 7 shows relationships between the frequency f of the applied voltage and the phase difference $\theta_{A-S}$ between the phase-A input voltage and the output voltage of the sensor S in the case of the annular vibration wave motor having the electrode arrangement in FIG. 6, where (a) is for the case of CW, and (b) is for the case of CCW.

In FIG. 6, there are provided phase-A electrodes $A_1$, $A_2$, $A_3$, $A_4$, $A_5$, $A_6$ and $A_7$ for driving, and phase-B electrodes $B_1$, $B_2$, $B_3$, $B_4$, $B_5$, $B_6$ and $B_7$. That is, in this conventional example, an 8-wavefront outward deflection vibration mode which produces 8 wavelengths on the annular ring is used. Hence, as seen in FIG. 7, the frequencies $f_8$ corresponding to this mode are normal resonance frequencies. At the frequencies $f_8$, the phase differences $\theta_{A-S}$ are ideally $-45°$ for CW and $-135°$ for CCW. By comparing the above-described $\theta_{A-S}$'s during rotation of the vibration wave motor with these angles, that is, $-45°$ for (a) in FIG. 7 and $-135°$ for (b) in FIG. 7, it is possible to know how close the vibration state is to the resonance state.

In the above-described conventional vibration wave motor, the center of sensitivity of the sensor electrode S deviates from the desired sensing point, that is, the point at which the phase difference $\theta_{A-S}$ is ideal. Typically, the desired sensing position is the physical center of the sensing point, in this case the physical center of the sensor electrode S. As shown in FIG. 8, the deviation depends on polarization directions of piezoelectric elements adjacent to both sides of the sensor electrode S constituting the phase S. Hence, a difference is produced like between (a) and (b) in FIG. 7 relative to the curve between the driving frequency f and the phase difference $\theta_{A-S}$ (refer to the dotted line in FIG. 7).

That is, since the polarizations for the piezoelectric elements adjacent to the phase-S electrode are in directions reverse to each other, voltages reverse to each other are produced at the interface of the elements to interfere with each other even if an identical strain is given. Hence, a voltage is hardly produced. If the polarizations are in the same direction, a voltage is easily produced, since there are no voltages which interfere with each other. Accordingly, for the entire sensor electrode S, the center of sensitivity of the phase S deviates to the right in FIG. 8.

That is, there is the problem that, even if vibration on the vibrator is in a resonance state, that state is not correctly detected.

Accordingly, there is also the problem that vibration of the vibrator is not correctly detected, and a proper driving frequency, that is, a resonance frequency for making the vibrator in a resonance state, cannot be applied to each electrode.

SUMMARY OF THE INVENTION

It is an object of the present invention to solve the problems as described above.

It is another object of the present invention to provide a vibration wave detecting device capable of correctly detecting vibration of a vibrator.

It is still another object of the present invention to provide a vibration wave driven actuator capable of easily supplying piezoelectric elements as electromechanical energy conversion elements with a resonance frequency.

In the present invention, electromechanical energy conversion elements are disposed on an elastic body, and first and second electrodes are provided on the elements. AC voltages having phases different from each other are applied to the first and second electrodes to produce a travelling vibration wave, which moves the elastic body relative to a member subjected to pressure contact with the elastic body. Means including a third electrode are provided to detect the vibration state. The center of sensitivity of the third electrode is adjusted to prevent the center of sensitivity from deviating from the center of the sensing position by, for example, making the characteristics of the elements adjacent to both sides of the third electrode identical. By so adjusting the center of sensitivity, the correct resonance frequency is detected.

DETAILED DESCRIPTION OF THE PREFERRED EMBODIMENTS

Figure 1:
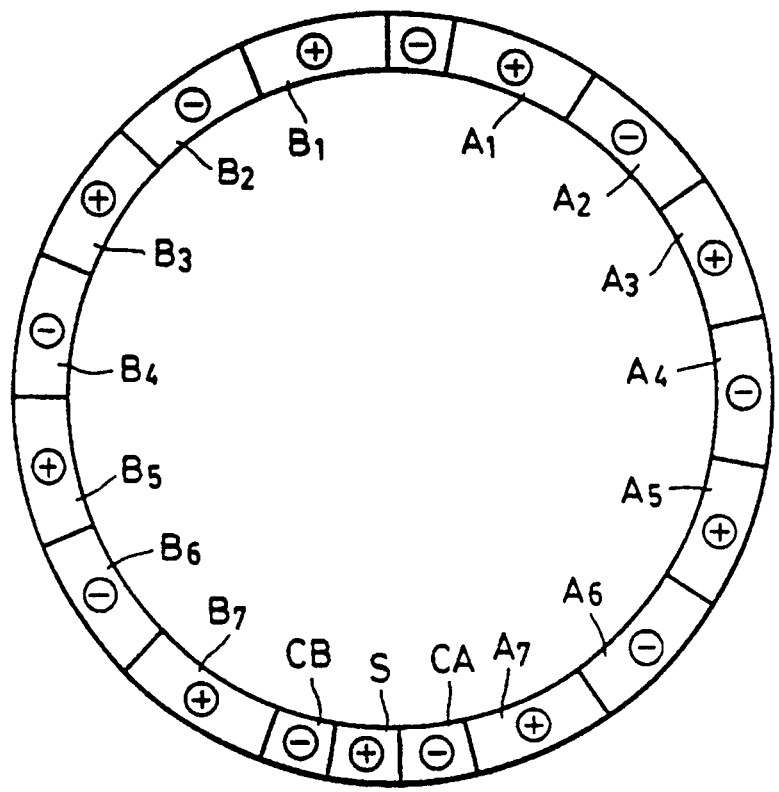
FIG. 1 is a plan view of a first embodiment showing the state of the electrode arrangement of a vibration wave motor according to the present invention.

FIG. 1 shows a first embodiment of the present invention, and shows the electrode arrangement of piezoelectric elements as electromechanical energy conversion elements bonded on a vibrator (not illustrated) of a hollow annular vibration wave motor, as well as polarization directions of piezoelectric elements.

In FIG. 1, there are shown electrodes $A_1$, $A_2$, $A_3$, $A_4$, $A_5$, $A_6$ and $A_7$ of phase-A piezoelectric elements. These elements are arranged to be connected to an appropriate excitation signal, such as that available at feeding terminal R in FIG. 4 in U.S. Pat. No. 4,510,411. Also shown are electrodes $B_1$, $B_2$, $B_3$, $B_4$, $B_5$, $B_6$ and $B_7$ of phase-B piezoelectric elements. These elements are arranged to be connected to an appropriate excitation signal, such as that available at feeding terminal L in FIG. 4 in the above-described U.S. Pat. No. 4,510,411. An electrode S of a piezoelectric element as a mechanical-to-electrical energy conversion element for detecting the vibration state of the vibrator (simply abbreviated hereinafter a sensor electrode), and a common electrodes CA and CB, each of which comprises a piezoelectric element, are also shown. In the present embodiment, common electrodes CA and CB having an identical polarization direction are disposed adjacent to both sides of the sensor electrode S. The common electrodes CA and CB are electrically connected to back-surface and front-surface electrodes of the piezoelectric elements for driving. Since other components of the vibration wave motor are identical to those in the above-described conventional example and the like, an explanation thereof will be omitted.

Figure 2:
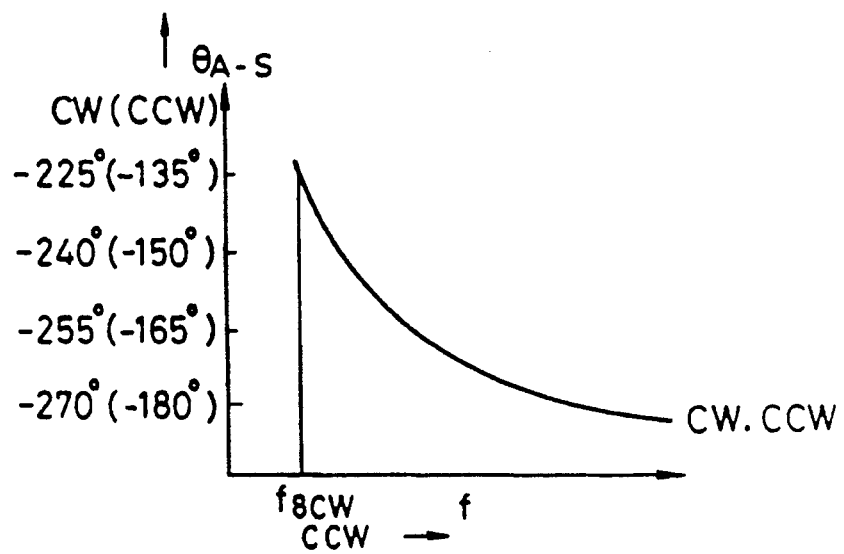
FIG. 2 is a diagram showing a relationship between the frequency f and the phase difference $\theta_{A-S}$ of the motor.
Figure 7:
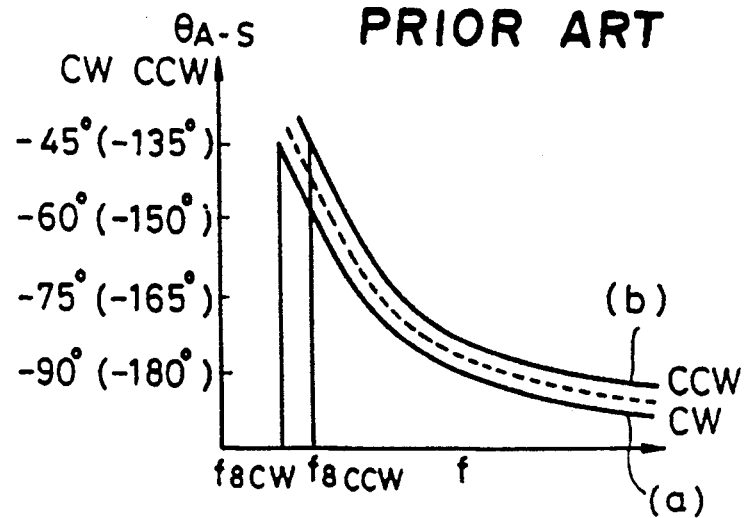
FIG. 7 is a diagram showing a relationship between the frequency f and the phase difference $\theta_{A-S}$ of the conventional motor.
Figure 8:
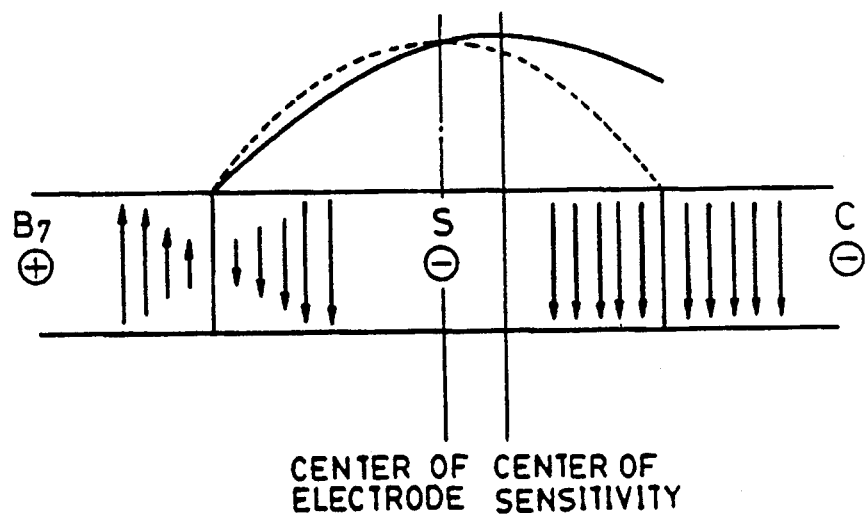
FIG. 8 is a cross-sectional view of the motor in FIG. 6.

The relationship between the frequency (f) and the phase difference $\theta_{A-S}$ of a sensor signal obtained from the sensor electrode S when a voltage $V = V_0 \sin \omega t$ and a voltage $V = V_0 \sin (\omega t \pm \pi/2)$ are applied to the phase-A electrodes $A_1$-$A_7$ and the phase-B electrodes $B_1$-$B_7$, respectively, is as shown in FIG. 2. That is, from FIG. 2, although there is a difference of 90° between −225° for the case of CW and −135° for the case of CCW in the phase difference $\theta_{A-S}$ at the normal resonance frequency $f_8$, the curve between the frequency f and the phase difference $\theta_{A-S}$ coincides with the ideal curve (shown by the dotted line in FIG. 7) in all frequencies.

As described above, by making characteristics of elements adjacent to both sides of the sensor electrode S symmetrical, for example, by making polarization directions identical, the center of sensitivity of the sensor electrode S is adjusted to coincide with the physical center of the sensing position, in this case the physical center of the sensor electrode S, and it is therefore possible to correctly detect the resonance state of the vibrator.

Figure 4:
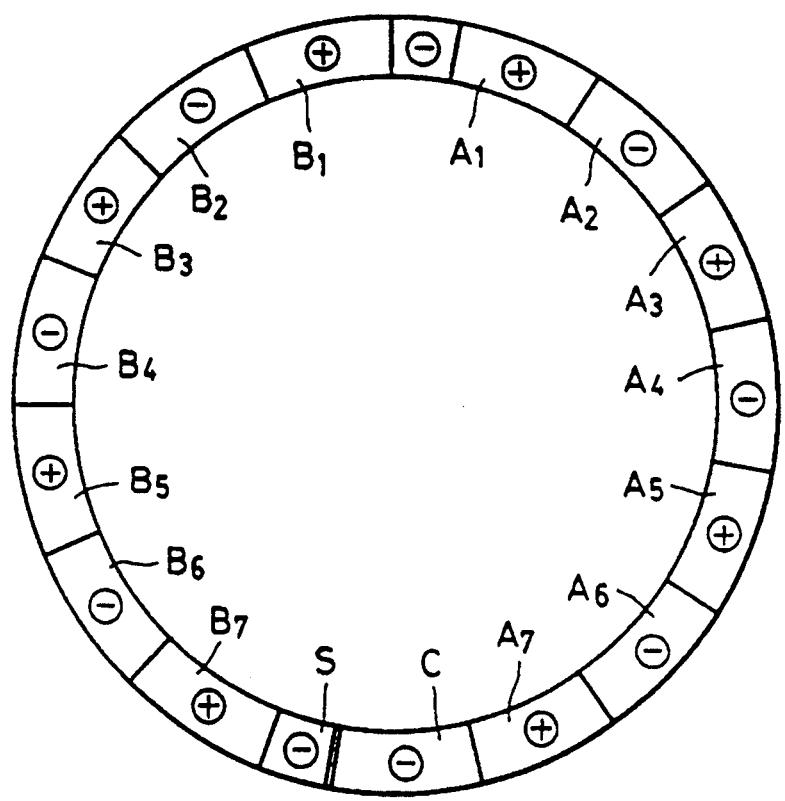
FIG. 4 is a plan view of a third embodiment.

Since the output from the sensor electrode S is supplied, for example, to a control unit (not shown), such as a controller 108 shown in FIG. 4 in the above-described U.S. Pat. No. 4,510,411, the frequency of driving signals supplied to the phase-A and phase-B electrodes ($A_1$-$A_7$ and $B_1$-$B_7$) for driving is adjusted to the resonance frequency.

Figure 3:
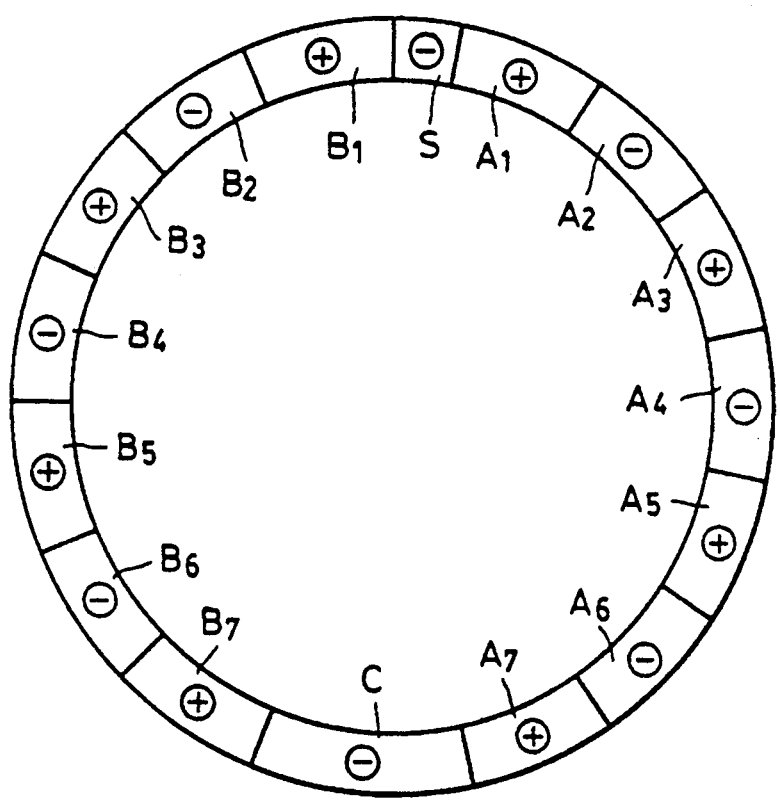
FIG. 3 is a plan view of a second embodiment.

FIG. 3 shows a second embodiment, and shows the electrode arrangement on piezoelectric elements and polarization directions of phase-A and phase-B piezoelectric elements for driving.

The configuration in FIG. 3 differs from that of the first embodiment shown in FIG. 1 in that a sensor electrode S is disposed between electrodes $A_1$ and $B_1$ having the same polarization direction, and a common electrode C is disposed between electrodes $A_7$ and $B_7$ for driving. By providing a configuration as in the present embodiment, the number of common electrodes can be reduced to one.

Figure 5:
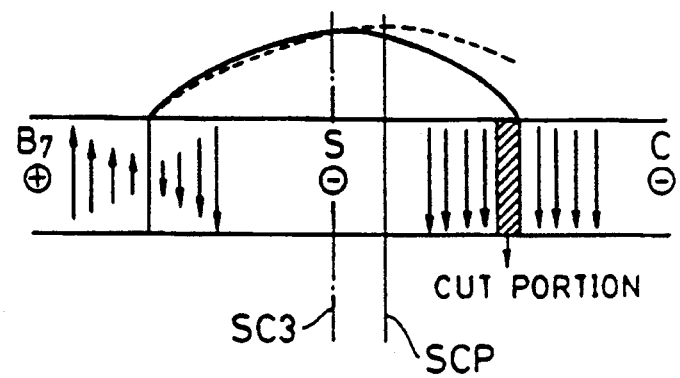
FIG. 5 is a cross-sectional view thereof.

FIG. 4 shows a third embodiment, and shows the electrode arrangement on piezoelectric elements and polarization directions of phase-A and phase-B piezoelectric elements for driving. Although the third embodiment is almost identical to the conventional example, the shape of a sensor electrode S is modified in consideration of the influence by polarization and the like. That is, by cutting or trimming the side of the electrode to which the center of sensitivity is deviated, the center of sensitivity is adjusted to its desired position. In FIG. 5, there is shown the center of sensitivity SC3 for the case of the third embodiment, and the center of sensitivity SCP for the conventional example. In FIG. 5, it will be seen that the adjusted center of sensitivity SC3 coincides with the desired position, i.e. the geometrical center of the sensing position. In this case, however, the geometrical center of the sensing position is different from that of sensing electrode S because a portion of electrode S has been cut away.

Figure 6:
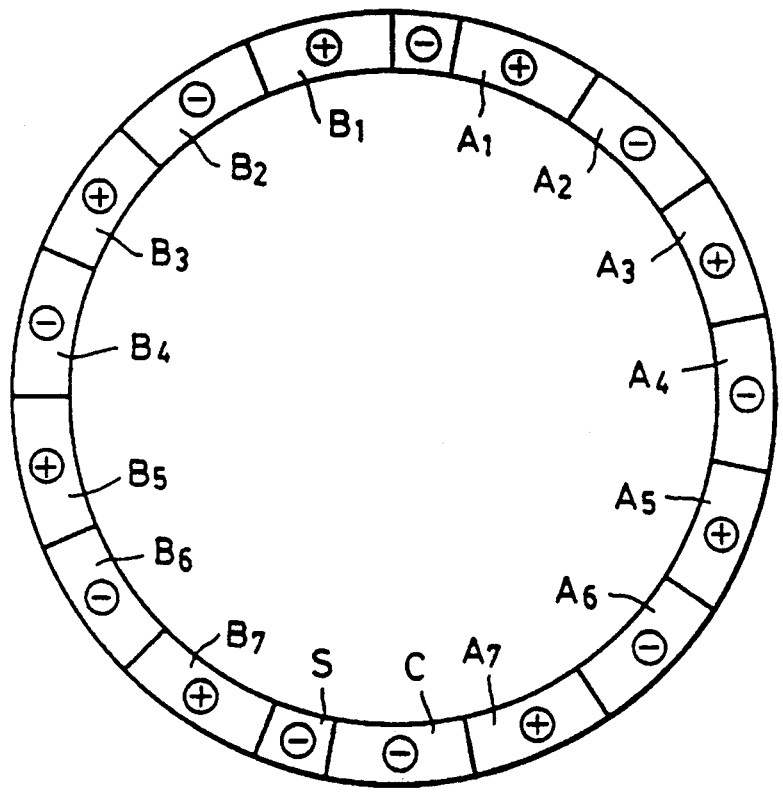
FIG. 6 is a plan view of a conventional vibration wave motor.

In the third embodiment, even if polarization directions of elements adjacent to both sides of the phase S electrode are different from each other, the same effect as in the first embodiment in FIG. 1 is provided because of the following reason. That is, if a part of the sensor electrode S in the conventional example as in FIG. 6 is cut or trimmed as shown in FIG. 5, no voltage is produced from the cut portion. Hence, in total, the sensitivity at that side is decreased, and the sensor electrode S becomes equivalent to that in which the polarization direction of common electrodes CA and CB adjacent to the sensor electrode is reverse to the polarization direction of the sensor electrode S (see FIG. 1).

The same effect as in the above-described embodiment can also be obtained, if a part of the piezoelectric element for driving in FIG. 5, for example, a part of the side adjacent to the sensor electrode S in the piezoelectric element B₇, is cut off or trimmed as in the example shown in FIG. 5.

Furthermore, as in FIGS. 1, 3 and 5, without providing physical characteristic-correction means, and with keeping the arrangement of the piezoelectric elements A₁-A₇, B₁-B₇ for driving and the sensor electrode S as in the conventional example shown in FIG. 6, the output of the sensor electrode S may instead be shifted by biasing means to electrically correct the deviation in its output characteristics.

As explained above, according to the present invention, since the center of sensitivity of the sensor electrode is adjusted to coincide with the desired detection point, namely the center of the sensing position, it is possible to correctly detect vibration of the vibrator to which the piezoelectric elements for driving are connected. In other words, since a shift amount from the resonance state of the vibrator can be correctly detected from the phase shift between the output of the sensor phase and the applied voltage, it is possible to easily drive the vibrator in the resonance state.

What is claimed is:

1. A vibration wave driven actuator comprising a vibration member, driving means for producing a travelling vibration wave in said vibration member, a single sensor for sensing the vibration state of the vibration member, and first and second common electrodes operatively associated with said driving means, said first and second common electrodes being disposed on opposite sides of said single sensor.

2. A vibration driven actuator comprising;
a vibration member;
driving means for producing a travelling vibration wave in said vibration member;
a sensor for sensing a vibration state of the vibration member; and
first and second electrodes operatively associated with said driving means, said first electrode having a polarity different from a polarity of said sensor and said second electrode having a polarity the same as the polarity of said sensor,
wherein said first electrode is arranged on one side of said sensor with a first gap therebetween, the first gap having a width and no polarity, and
wherein said second electrode is arranged on another side of said sensor opposite said first electrode with a second gap therebetween, the second gap being greater than the first gap.

3. A vibration wave driven actuator comprising:
a vibration member;
a first electromechanical energy conversion element for applying a first vibration to the vibration member in response to an applied electrical signal;
a second electromechanical energy conversion element for applying a second vibration to the vibration member in response to an applied electrical signal;
a single mechanical-to-electric energy conversion element for producing an electrical signal based on the vibration state of a desired sensing position on the vibration member;
a first common electrode for said first electromechanical energy conversion element, provided between said first electromechanical energy conversion element and said single mechanical-to-electric energy conversion element; and
a second common electrode for said second electromechanical energy conversion element, provided between said second electromechanical energy conversion element and said single mechanical-to-electric energy conversion element.

4. A vibration wave driven actuator according to claim 3, wherein said first and second common electrodes are provided adjacent said mechanical-to-electric energy conversion element, respectively.

5. A vibration wave driven actuator according to claim 4, wherein said vibration member is annular.

6. A vibration wave driven actuator having a vibration member and driving means for providing the member with a travelling vibration wave, the actuator comprising:
a single mechanical-to-electric energy conversion element for producing an electrical signal based on a vibration state of the vibration member; and
a pair of common electrodes of said driving means disposed adjacent opposite sides of said mechanical-to-electric energy conversion element, each comprising a piezoelectric element and having the same polarity.

7. A vibration wave driven actuator according to claim 1, wherein said first and second common electrodes are provided adjacent said sensor.

8. A vibration wave driven actuator according to claim 7, wherein said first and second common electrodes are provided adjacent said driving means.

9. A vibration wave driven actuator according to claim 2, wherein said sensor is provided adjacent said driving means.

10. A vibration wave driven actuator comprising a vibration member, driving means for producing a vibration wave in said vibration member, a single sensor for sensing the vibration state of the vibration member, and first and second common electrodes operatively associated with said driving means, said first and second common electrodes having identical polarity and being disposed on opposite sides of said sensor.

11. A vibration wave driven actuator comprising:
a vibration member;
a first electromechanical energy conversion element for applying a first vibration to the vibration member in response to an applied first alternating electrical signal;
a second electromechanical energy conversion element for applying a second vibration to the vibration member in response to an applied second alternating electrical signal which has a phase different from a phase of said first alternating electrical signal;
a single mechanical-to-electric energy conversion element for producing an electrical signal based on the vibration state of a desired sensing position on the vibration member;
a first common electrode provided between said first electromechanical energy conversion element and said single mechanical-to-electric energy conversion element; and
a second common electrode provided between said second electromechanical energy conversion element and said single mechanical-to-electric energy conversion element;
wherein a polarization direction of said first and second common electrodes is identical.

12. A vibration wave driven actuator comprising a vibration member, at least a pair of driving means for producing a travelling vibration wave in said vibration member, a single sensor for sensing a vibration state of the vibration member, and first and second common electrodes operatively associated with said pair of driving means, said first and second common electrodes being disposed on opposite sides of said single sensor and having the same polarity, the polarity of said first and second common electrodes being different from the polarity of said single sensor.

13. A vibration driven motor comprising a vibration member, a driving member for producing a vibration in said vibration member, a single sensor for sensing a vibration state of the vibration member, and first and second common electrodes operatively associated with said driving member, said first and second common electrodes being disposed on opposite sides of said single sensor and having the same polarity.

14. A vibration driven motor comprising a vibration member, a driving member for producing a vibration in said vibration member, a single sensor for sensing a vibration state of the vibration member, and first and second electrodes being operatively associated with said motor and disposed on opposite sides of said sensor, one of said first and second electrodes having a polarity different from a polarity of the sensor and the other of said first and second electrodes having a polarity the same as the polarity of said sensor, wherein said sensor and said electrode having a polarity the same as the polarity of the sensor are arranged with a first gap therebetween, said first gap having a width and no polarity, and wherein said sensor and said electrode having a polarity different from the polarity of said sensor are arranged with a second gap therebetween, the second gap having no polarity and a width less than the width of the first gap.

* * * * *

UNITED STATES PATENT AND TRADEMARK OFFICE
CERTIFICATE OF CORRECTION

PATENT NO. : 5,247,221

DATED : September 21, 1993

INVENTOR(S) : ATSUTA

It is certified that error appears in the above-indentified patent and that said Letters Patent is hereby corrected as shown below:

Column 1

Line 33, "$V = V_D$" should read --$V = V_O$--.

Signed and Sealed this

Nineteenth Day of April, 1994

BRUCE LEHMAN

*Attest:*

*Attesting Officer*     *Commissioner of Patents and Trademarks*